(12) United States Patent
Kim et al.

(10) Patent No.: US 11,608,119 B2
(45) Date of Patent: Mar. 21, 2023

(54) REAR VEHICLE BODY COMBINATION STRUCTURE

(71) Applicants: Hyundai Motor Company, Seoul (KR); Kia Motors Corporation, Seoul (KR)

(72) Inventors: Sun Ho Kim, Suwon-si (KR); Byoung Chul Kim, Seoul (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 54 days.

(21) Appl. No.: 17/192,986

(22) Filed: Mar. 5, 2021

(65) Prior Publication Data

US 2022/0169316 A1 Jun. 2, 2022

(30) Foreign Application Priority Data

Nov. 30, 2020 (KR) .................. 10-2020-0164306

(51) Int. Cl.
*B62D 25/20* (2006.01)
*B62D 27/02* (2006.01)
*B23K 37/04* (2006.01)
*B62D 65/02* (2006.01)
*B23K 101/00* (2006.01)

(52) U.S. Cl.
CPC .......... *B62D 25/2027* (2013.01); *B23K 37/04* (2013.01); *B62D 27/02* (2013.01); *B62D 27/023* (2013.01); *B62D 65/024* (2013.01); *B23K 2101/006* (2018.08)

(58) Field of Classification Search
CPC .... B62D 25/20; B62D 25/08; B62D 25/2018; B62D 25/2027; B62D 27/023
USPC .... 296/204, 203.01–203.04, 193.03, 193.04, 296/193.07–193.09
See application file for complete search history.

(56) References Cited

U.S. PATENT DOCUMENTS 3,423,122 A * 1/1969 Wessells ................ B62D 23/00
296/204
5,102,187 A * 4/1992 Harasaki ................ B62D 25/20
296/204

FOREIGN PATENT DOCUMENTS

JP 2000108947 A * 4/2000

\* cited by examiner

*Primary Examiner* — Dennis H Pedder
(74) *Attorney, Agent, or Firm* — Slater Matsil, LLP

(57) ABSTRACT

A vehicle body combination structure includes a center floor panel extending from a lower portion of a vehicle body along a longitudinal direction of the vehicle body, and a rear floor panel disposed at a rear of the vehicle body and connected to the center floor panel, wherein one end surface of the center floor panel and one end surface of the rear floor panel are vertically overlapped to form an overlap region, and wherein the rear floor panel and the center floor panel form a wheel base of the vehicle body.

20 Claims, 8 Drawing Sheets

FIG. 2

(Unit : mm)

| Item \ Vehicle type | | A | B | C | D | Difference |
|---|---|---|---|---|---|---|
| Full length | | 4,570 | 4,640 | 4,340 | 4,310 | 260 |
| Full width | | 1,800 | 1,800 | 1,795 | 1,800 | 5 |
| Wheel base | | 2,700 | 2,700 | 2,650 | 2,650 | 50 |
| overhang | Front | 880 | 900 | 905 | 880 | 20 ~ 25 |
| | Rear | 990 | 1,040 | 785 | 780 | 5 ~ 50 |

REAR VEHICLE BODY COMBINATION STRUCTURE

CROSS-REFERENCE TO RELATED APPLICATIONS

This application claims the benefit of Korean Patent Application No. 10-2020-0164306, filed in the Korean Intellectual Property Office on Nov. 30, 2020, which application is hereby incorporated herein by reference.

TECHNICAL FIELD

The present invention relates to a rear vehicle body combination structure.

BACKGROUND

In vehicle manufacturing, changes in vehicle specifications within the same platform, excluding the design of the vehicle, are generally changes in front overhang, wheel base, full width, and rear overhang. In particular, when the wheel base is different even within the same platform, in order to absorb the structural difference, a center floor panel or a rear floor panel is generally extended and manufactured respectively.

In addition, if the wheel base is different, the overall development process for newly developed parts (design/prototype parts production, assembly/modal parts separate production, and assembly/purchase/logistics/performance evaluation, etc.) should also be responded accordingly. And, each center floor panel and rear floor panel must be developed.

FIG. 1 is a view showing a wheel base and an overhang of a vehicle, FIG. 2 is a table showing the amount of change in the wheel base according to the vehicle type, and FIGS. 3 and 4 are views showing a structure for connecting a center floor panel and a rear floor panel corresponding to the length of the wheel base.

As shown in FIG. 1 and FIG. 2, the wheel base, which is the distance between the front wheel axle and the rear wheel axle of a vehicle, may differ by up to about 50 mm depending on the vehicle type (A, B, C, D). Compared to the C and D models with a wheel base of 2,650 mm in length, in the A and B models with a wheel base of about 50 mm larger, as shown in FIG. 3, the center floor panel 1 is manufactured to be about 50 mm long, or as shown in FIG. 4, the rear floor panel 2 is manufactured in a longer length to respond.

However, since the center floor panel 1 or the rear floor panel 2 needs to be newly manufactured for each vehicle model having a wheel base of a different length, there is a problem in that time and cost are generated accordingly.

The above information disclosed in this Background section is only for enhancement of understanding of the background of the invention, and therefore it may contain information that does not form the prior art that is already known in this country to a person of ordinary skill in the art.

SUMMARY

The present invention relates to a rear vehicle body combination structure. Particular embodiments relate to a rear vehicle body combination structure to flexibly respond to wheel base changes by changing the welding point of the center floor panel and rear floor panel of the vehicle body.

Embodiments of the present invention provide a rear vehicle body combination structure that can improve car body rigidity in particular, by flexibly responding to changes in the wheel base, minimizing the development investment cost, and constructing a closed section in the overlapping part of the center floor panel and the rear floor panel within the same vehicle manufacturing platform.

A rear vehicle body combination structure according to an exemplary embodiment of the present invention includes a center floor panel formed to extend from a lower portion of the vehicle body along the longitudinal direction of the vehicle body, and a rear floor panel provided at the rear of the vehicle body and connected to the center floor panel, wherein one end surface of the center floor panel and one end surface of the rear floor panel are vertically overlapped to form an overlap region, thereby forming a wheel base of the vehicle body.

One end surface of the center floor panel and one end surface of the rear floor panel may be joined by welding along a direction perpendicular to the longitudinal direction of the vehicle body.

One end surface of the center floor panel and one end surface of the rear floor panel may be joined to have a minimum overlap area by single row welding.

The minimum overlap area may be formed to have a length range of 35 mm to 45 mm.

One end surface of the center floor panel and one end surface of the rear floor panel may be joined to have a maximum overlap area by two-row welding.

The maximum overlap area may be formed to have a length range of 65 mm to 75 mm.

One end surface of the center floor panel and one end surface of the rear floor panel may be formed symmetrically in different directions.

One end surface of the center floor panel may be formed to be convex upward of the vehicle body, and one end surface of the rear floor panel may be formed to be convex downward of the vehicle body.

One end surface of the center floor panel and one end surface of the rear floor panel may be joined by two-row welding to form a closed cross-section between the center floor panel and the rear floor panel.

As described above, according to embodiments of the present invention, within the same vehicle manufacturing platform, it can flexibly respond to specification differences, especially wheel base changes, while minimizing development investment.

In addition, the same center floor panel and rear floor panel can be used for common use in vehicles with different wheel bases.

In addition, the rigidity of the vehicle body can be improved by forming a closed cross-section in the overlapped portion of the center floor panel and the rear floor panel.

In addition, by providing a rear vehicle body combination structure, it is possible to maximize profitability through unification of processes such as design, purchase, production, quality, logistics, and AS.

BRIEF DESCRIPTION OF THE DRAWINGS

FIG. 2 is a table showing the amount of change in the wheel base according to the vehicle type.

Figure 1:
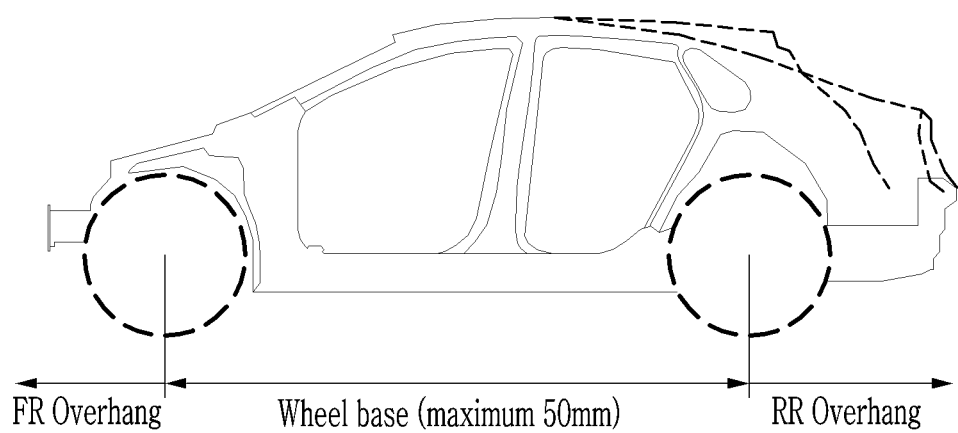
FIG. 1 is a view showing a wheel base and an overhang of a vehicle.
Figure 3:
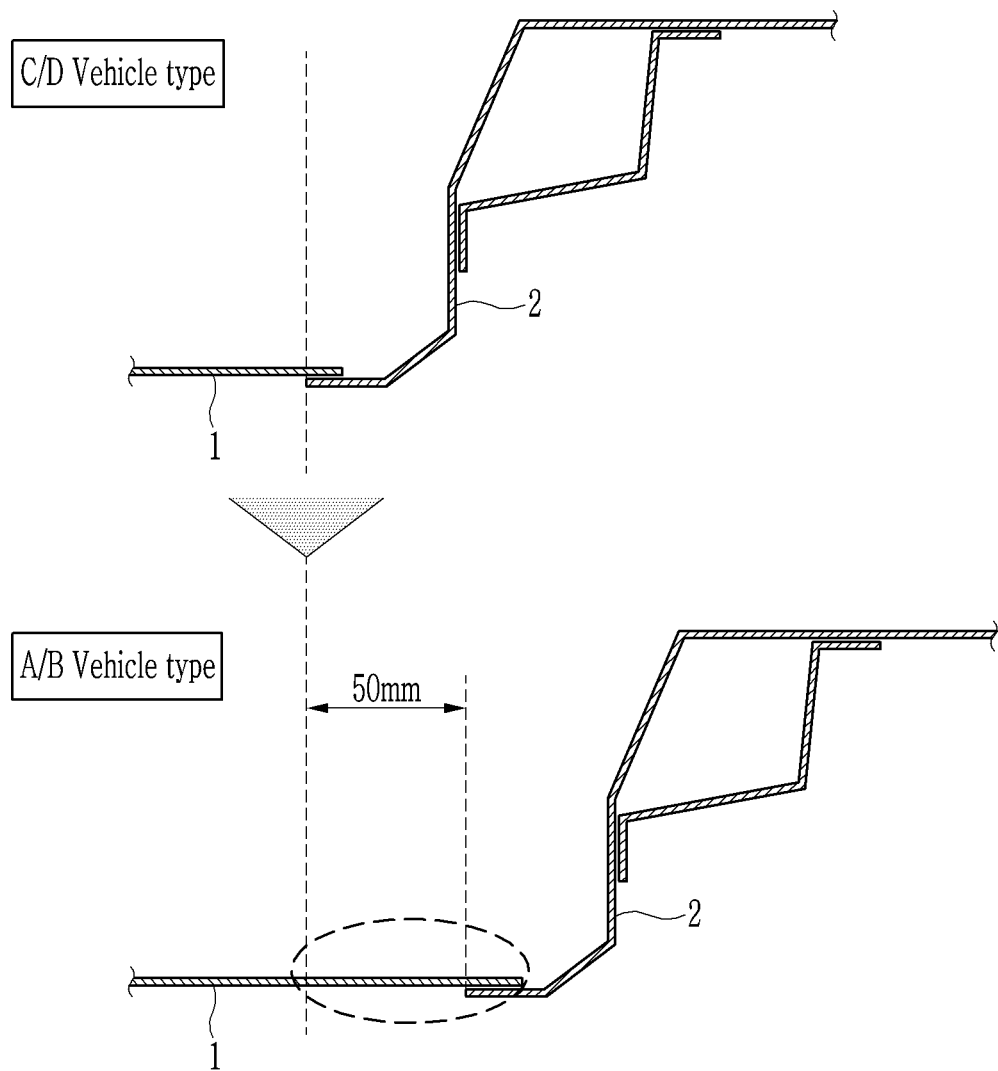
FIG. 3 is a diagram illustrating a structure in which a center floor panel is extended and manufactured according to the length of the wheel base of the vehicle model shown in FIG. 2.
Figure 4:
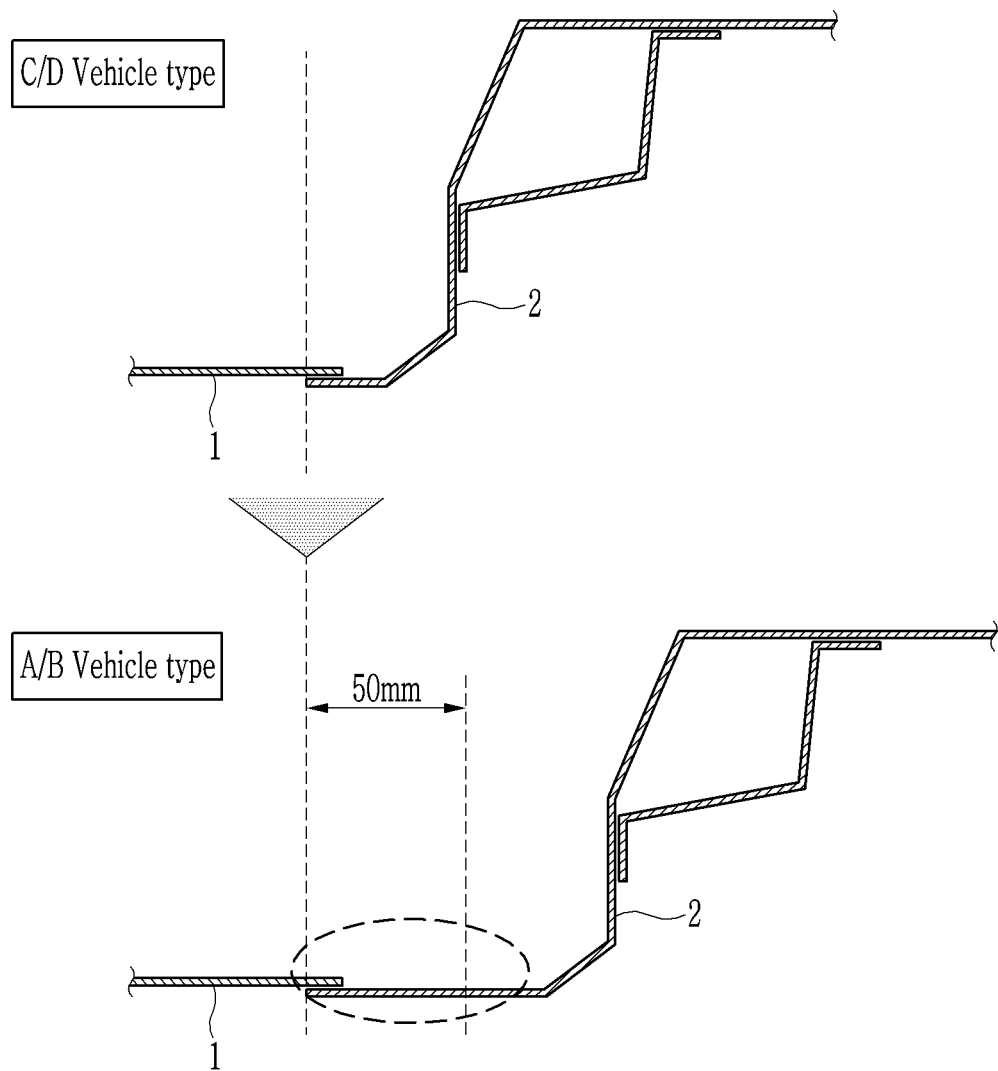
FIG. 4 is a diagram illustrating a structure in which a rear floor panel is extended and manufactured according to the length of the wheel base of the vehicle model shown in FIG. 2.

The following elements are used to describe embodiments of the present invention.

| 10: center floor panel | 20: rear floor panel |
| A: welding point | B: closed cross-section |

DETAILED DESCRIPTION OF ILLUSTRATIVE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, a rear vehicle body combination structure according to an exemplary embodiment of the present invention will be described with reference to attached drawings.

Figure 5:
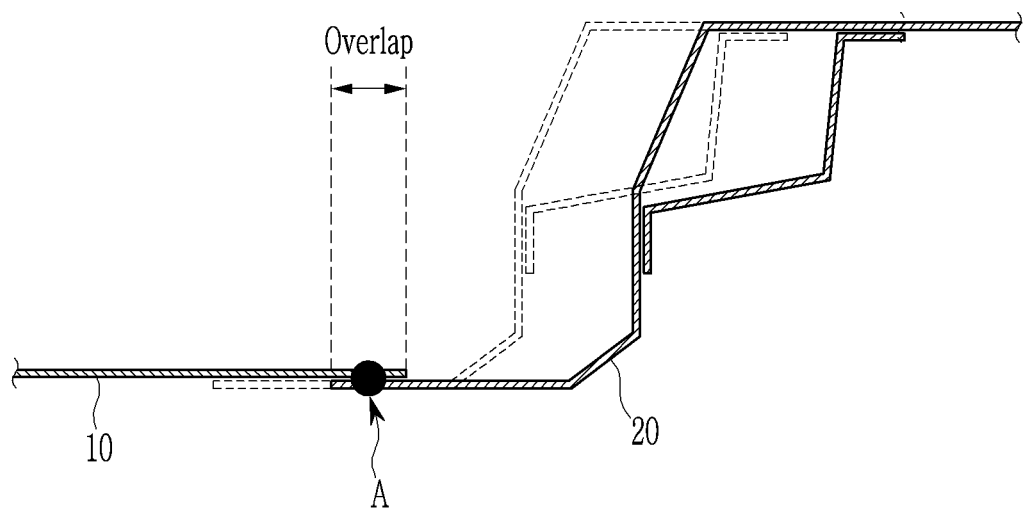
FIG. 5 is a view showing a rear vehicle body combination structure to which single-row welding is applied according to an exemplary embodiment of the present invention.

FIG. 5 is a view showing a rear vehicle body combination structure to which single-row welding is applied according to an exemplary embodiment of the present invention.

Referring to FIG. 5, a rear vehicle body combination structure according to an exemplary embodiment of the present invention includes a center floor panel 10 and a rear floor panel 20.

The center floor panel 10 is formed to extend from a lower portion of the vehicle body along the longitudinal direction of the vehicle body. Further, the rear floor panel 20 is provided at the rear of the vehicle body, and one end thereof is coupled to overlap one end of the center floor panel 10.

One end surface of the center floor panel 10 and one end surface of the rear floor panel 20 may be joined to have an overlap area by being vertically overlapped. In the overlap area, it may be attached by welding so that the upper surface of the rear floor panel 20 is overlapped by the lower surface of the center floor panel 10. The welding point (A) may be formed by a plurality of spot welding or line welding along a direction perpendicular to the longitudinal direction of the vehicle body.

The example shown in FIG. 5 is a condition in which the wheel base has a maximum length, and the center floor panel 10 and the rear floor panel 20 may be joined to have a minimum overlap area by single row welding. In this case, the minimum overlap area may be formed to have a length of about 35 mm to about 45 mm. In this context, the overlap area is given length of the overlap area (e.g., about 35 mm to about 45 mm, in this case) times the lateral width of the overlap region between the center floor panel 10 and the rear floor panel 20, the width being perpendicular to the length.

Figure 6:
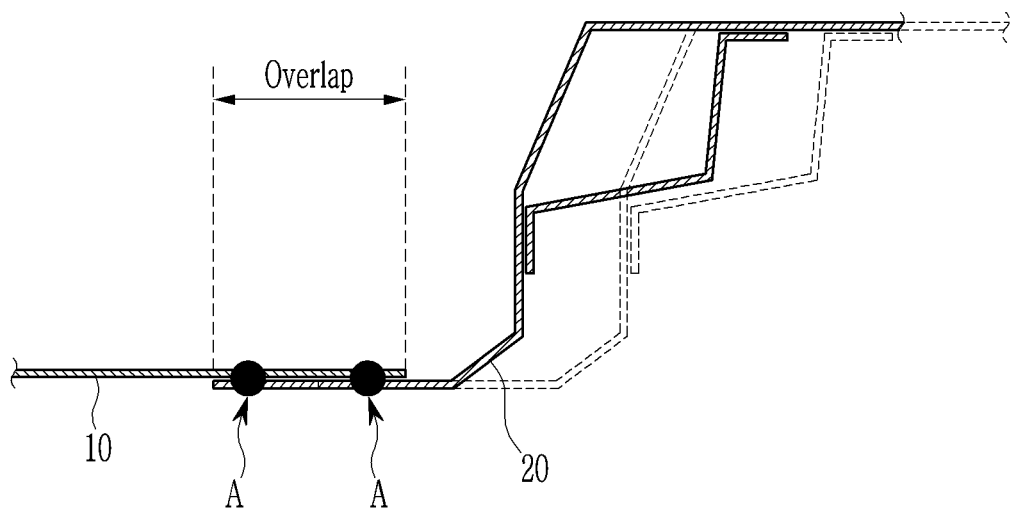
FIG. 6 is a view showing a rear vehicle body combination structure to which two-row welding is applied according to an exemplary embodiment of the present invention.

FIG. 6 is a view showing a rear vehicle body combination structure to which two-row welding is applied according to an exemplary embodiment of the present invention.

Referring to FIG. 6, in the overlap area, the upper surface of the rear floor panel 20 may be attached to the lower surface of the center floor panel 10 by two-row welding so that the upper surface of the rear floor panel 20 is overlapped. As in the example of FIG. 5, the welding point A of the two-row welding may be formed by a plurality of point welding, or by two line welding parallel to each other along a direction perpendicular to the longitudinal direction of the vehicle body.

The example shown in FIG. 6 is a condition in which the wheel base has a minimum length, and the center floor panel 10 and the rear floor panel 20 may be combined to have a maximum overlap area by two-row welding. In this case, the maximum overlap area may be formed to have a length of about 65 mm to about 75 mm.

Figure 7:
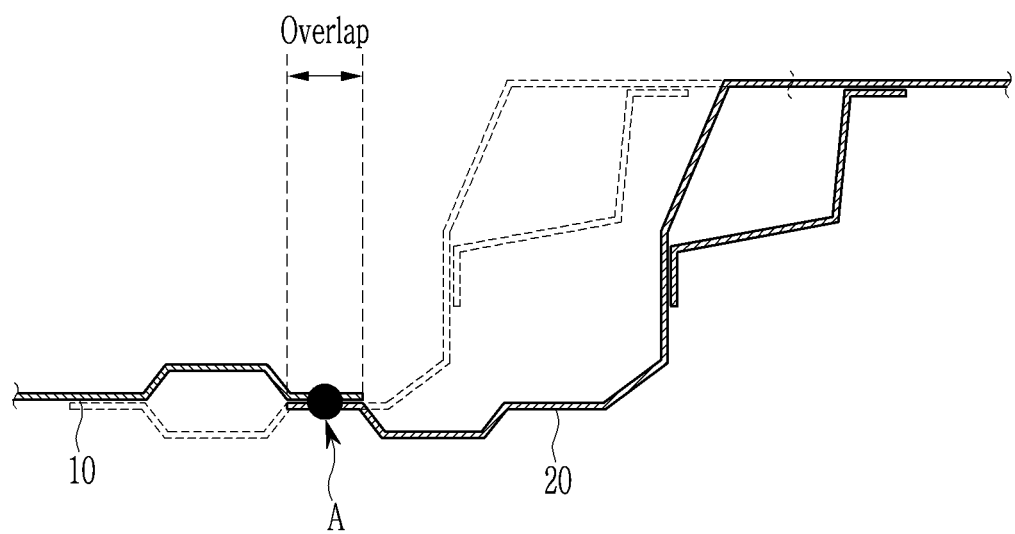
FIG. 7 is a view showing a rear vehicle body combination structure to which single-row welding is applied according to another exemplary embodiment of the present invention.

FIG. 7 is a view showing a rear vehicle body combination structure to which single-row welding is applied according to another exemplary embodiment of the present invention.

Referring to FIG. 7, one end surface of the center floor panel 10 and one end surface of the rear floor panel 20 may be formed to be formed symmetrically in different directions. One end surface of the center floor panel 10 may be formed in a convex shape upward of the vehicle body, and one end surface of the rear floor panel 20 may be formed in a convex shape downward direction of the vehicle body.

As shown in FIG. 7, cross-sections of the center floor panel 10 and the rear floor panel 20 that are not formed in the convex shape are joined with each other up and down to have an overlap area. The overlap area may be attached by welding so that the upper surface of the rear floor panel 20 is overlapped by the lower surface of the center floor panel 10. The welding point A may be formed by a plurality of spot welding or line welding along a direction perpendicular to the longitudinal direction of the vehicle body.

The example shown in FIG. 7 is a condition in which the wheel base has a maximum length, and the center floor panel 10 and the rear floor panel 20 may be combined to have a minimum overlap area by single row welding. In this case, the minimum overlap area may be formed to have a length of about 35 mm to about 45 mm.

Figure 8:
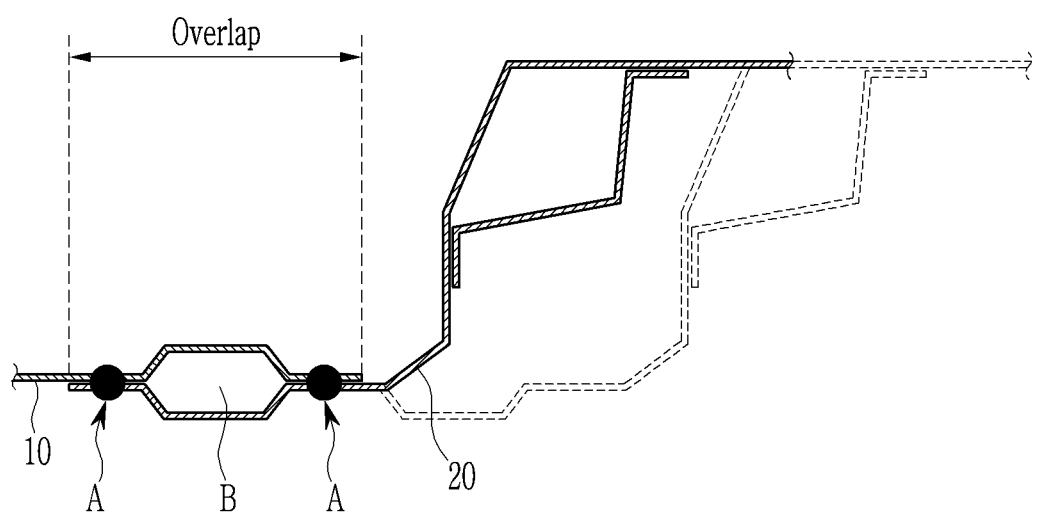
FIG. 8 is a view showing a rear vehicle body combination structure to which two-row welding is applied according to another exemplary embodiment of the present invention.

FIG. 8 is a view showing a rear vehicle body combination structure to which two-row welding is applied according to another exemplary embodiment of the present invention.

Referring to FIG. 8, in the overlap area, the upper surface of the rear floor panel 20 may be attached to the lower surface of the center floor panel 10 by two-row welding so that the upper surface of the rear floor panel 20 is overlapped. As in the example of FIG. 7, the welding point A of two-row welding may be formed by a plurality of spot welding along a direction perpendicular to the longitudinal direction of the vehicle body, or may be formed by two line welding parallel to each other.

The example shown in FIG. 8 is a condition in which the wheel base has a minimum length, and the center floor panel 10 and the rear floor panel 20 may be combined to have a maximum overlap area by two-row welding. In this case, the maximum overlap area may be formed to have a length of about 65 mm to about 75 mm.

In addition, by the forming shape of the center floor panel 10 and the rear floor panel 20, the center floor panel 10 and the rear floor panel 20 may be coupled by forming a closed cross-section B between the center floor panel 10 and the rear floor panel 20. In this case, the welding point A of the two-row welding may be formed by two-line welding parallel to each other along a direction perpendicular to the longitudinal direction of the vehicle body. This closed cross-section B becomes a box shape that crosses the left/right side of the vehicle body along a direction perpendicular to the longitudinal direction of the vehicle body, and the torsional rigidity of the vehicle body can be increased by this shape.

On the other hand, the closed cross-section B formed by the forming shape of the center floor panel 10 and the rear floor panel 20 may be formed in plural, and thus may be applied to various wheel bases. When the closed cross-section B is formed in a plurality, the welding point A may be formed in a plurality of three or more.

Like this, by joining the center floor panel and rear floor panel of the vehicle body through single or two-row welding within the same vehicle manufacturing platform, it can flexibly respond to specification differences, especially wheel base changes, while minimizing development investment.

In addition, the same center floor panel and rear floor panel can be used for common use in vehicles with different wheel bases.

In addition, the rigidity of the vehicle body can be improved by forming a closed cross-section in the overlapped portion of the center floor panel and the rear floor panel.

In addition, by providing a rear vehicle body combination structure, it is possible to maximize profitability through unification of processes such as design, purchase, production, quality, logistics, and AS.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body combination structure comprising:
a center floor panel extending from a lower portion of a vehicle body along a longitudinal direction of the vehicle body; and
a rear floor panel disposed at a rear of the vehicle body and connected to the center floor panel, wherein one end surface of the center floor panel and one end surface of the rear floor panel are vertically overlapped to form an overlap region, and
wherein the rear floor panel and the center floor panel are spaced to define a wheel base region of the vehicle body, the wheel base region extending between a location for a front axle and a location for a rear axle; and
wherein the one end surface of the center floor panel and the one end surface of the rear floor panel are formed symmetrically in different directions.

2. The structure of claim 1, wherein the one end surface of the center floor panel and the one end surface of the rear floor panel are welded along a direction perpendicular to the longitudinal direction of the vehicle body.

3. The structure of claim 2, wherein the one end surface of the center floor panel and the one end surface of the rear floor panel are joined by single row welding.

4. The structure of claim 3, wherein an overlap area between the center floor panel and the rear floor panel has a length between 35 mm and 45 mm.

5. The structure of claim 2, wherein the one end surface of the center floor panel and the one end surface of the rear floor panel are joined by two-row welding.

6. The structure of claim 5, wherein an overlap area between the center floor panel and the rear floor panel has a length between 65 mm and 75 mm.

7. The structure of claim 1, wherein the overlap region has a length between 35 mm and 75 mm.

8. The structure of claim 1, wherein:
the one end surface of the center floor panel includes a portion that is convex upward of the vehicle body; and
the one end surface of the rear floor panel includes a portion that is convex downward of the vehicle body.

9. The structure of claim 8, wherein the one end surface of the center floor panel and the one end surface of the rear floor panel are welded to form a closed cross-section between the center floor panel and the rear floor panel.

10. A vehicle comprising:
a vehicle body including a rear wheel base region, the rear wheel base region comprising:
a center floor panel extending from a lower portion of the vehicle body along a longitudinal direction of the vehicle body; and
a rear floor panel disposed at a rear of the vehicle body and connected to the center floor panel, wherein one end surface of the center floor panel and one end surface of the rear floor panel are vertically overlapped to form an overlap region and are joined by welding along a direction perpendicular to the longitudinal direction of the vehicle body and wherein the one end surface of the center floor panel and the one end surface of the rear floor panel are formed symmetrically in different directions; and a rear wheel axle coupled to the vehicle body and extending into the rear wheel base region in a direction perpendicular to the longitudinal direction of the vehicle body.

11. The vehicle of claim 10, wherein the one end surface of the center floor panel and the one end surface of the rear floor panel are single row welded such that the overlap region has a length between 35 mm and 45 mm.

12. The vehicle of claim 10, wherein the one end surface of the center floor panel and the one end surface of the rear floor panel are two-row welded such that the overlap region has a length between 65 mm and 75 mm.

13. The vehicle of claim 10, wherein:
the one end surface of the center floor panel includes a portion that is convex upward of the vehicle body; and
the one end surface of the rear floor panel includes a portion that is convex downward of the vehicle body.

14. The vehicle of claim 13, wherein the one end surface of the center floor panel and the one end surface of the rear floor panel are welded to form a closed cross-section between the center floor panel and the rear floor panel.

15. A method of forming a vehicle body, the method comprising:
determining a required wheel base of the vehicle body;
positioning a center floor panel from a lower portion of a vehicle body along a longitudinal direction of the vehicle body and a rear floor panel at a rear of the vehicle body along the longitudinal direction relative to one another so that one end surface of the center floor panel and one end surface of the rear floor panel are vertically overlapped to form an overlap region of a wheel base of the vehicle body, wherein a length of the overlap region is based on the required wheel base of the vehicle body; and
joining the one end surface of the center floor panel and the one end surface of the rear floor panel by welding along a direction perpendicular to the longitudinal direction of the vehicle body, wherein the one end surface of the center floor panel and the one end surface of the rear floor panel are formed symmetrically in different directions.

16. The method of claim 15, wherein determining the required wheel base comprises determining whether the overlap region is to have a minimum overlap area or a maximum overlap area.

17. The method of claim 16, wherein the minimum overlap area is between 35 mm and 45 mm and the maximum overlap area is between 65 mm and 75 mm.

18. The method of claim 16, wherein joining the one end surface of the center floor panel and the one end surface of the rear floor panel by welding comprises:
single row welding when it is determined that the overlap region is to have the minimum overlap area; and
two-row welding when it is determined that the overlap region is to have the maximum overlap area.

19. The method of claim 16, wherein the minimum overlap area is between 35 mm and 45 mm.

20. The method of claim 16, wherein the maximum overlap area is between 65 mm and 75 mm.

* * * * *

UNITED STATES PATENT AND TRADEMARK OFFICE
CERTIFICATE OF CORRECTION

PATENT NO. : 11,608,119 B2
APPLICATION NO. : 17/192986
DATED : March 21, 2023
INVENTOR(S) : Sun Ho Kim It is certified that error appears in the above-identified patent and that said Letters Patent is hereby corrected as shown below:

On the Title Page

Item (73) Assignee; delete "Cornoration" and insert --Corporation--.

Signed and Sealed this
Eighteenth Day of April, 2023

Katherine Kelly Vidal
*Director of the United States Patent and Trademark Office*